United States Patent [19]

Prince

[11] Patent Number: 4,542,570

[45] Date of Patent: Sep. 24, 1985

[54] PORTABLE FAN BLADE AND SHEAVE REMOVING DEVICE

[76] Inventor: Vernon Prince, 120 Utah, Yukon, Okla. 73009

[21] Appl. No.: 531,640

[22] Filed: Sep. 13, 1983

[51] Int. Cl.[4] .............................................. B23P 19/04

[52] U.S. Cl. ..................................................... 29/252

[58] Field of Search ................. 29/251, 252, 256, 257, 29/227, 244, 266, 239; 254/10.5

[56] References Cited

U.S. PATENT DOCUMENTS

| | | | |
|---|---|---|---|
| 1,377,469 | 5/1921 | Erickson | 29/256 |
| 1,590,918 | 6/1926 | Tindell | 29/251 |
| 3,599,311 | 3/1969 | Ellis | 29/266 |
| 3,814,382 | 6/1974 | Castol | 254/10.5 |
| 4,009,867 | 3/1977 | Diffenderfer | 29/227 |
| 4,235,004 | 11/1980 | Floyd | 29/257 |
| 4,429,857 | 2/1984 | Ferguson | 29/252 |

FOREIGN PATENT DOCUMENTS

| | | | |
|---|---|---|---|
| 1137999 | 10/1962 | Fed. Rep. of Germany | 29/252 |

*Primary Examiner*—Robert C. Watson

[57] ABSTRACT

This device is portable, and provides for the quick and easy removal of fan blades and sheaths from their shafts. Primarily, it consists of a base plate with a housing on it to hold the motor and shaft down. It further includes a pair of hydraulic jacks attached to a pressure plate, which engages the hub of a blade or sheath, so as to push these components off of their respective shafts.

1 Claim, 2 Drawing Figures

PORTABLE FAN BLADE AND SHEAVE REMOVING DEVICE

This invention relates to hydraulic devices, and more particularly, to a portable fan blade and sheath removing device.

The principal object of this invention is to provide a portable fan blade and sheath removing device, which will be unique, in that it may be employed on a job site to remove a fan blade or a sheath.

Another object of this invention is to provide a portable fan blade and sheath removing device, which will quickly and easily remove such components, with little effort.

Another object of this invention is to provide a portable fan blade and sheath removing device, which may also be employed to remove gears from shafts, when desired.

A further object of this invention is to provide a portable fan blade and sheath removing device, which will employ the use of hydraulic jacks for delivering the necessary pounds per square inch, to effect the removal of such components from their respective shafts, and the device will also be safe in operation.

Other objects are to provide a portable fan blade and sheath removing device, which is simple in design, inexpensive to manufacture, rugged in construction, easy to use, and efficient in operation.

Figure 1:
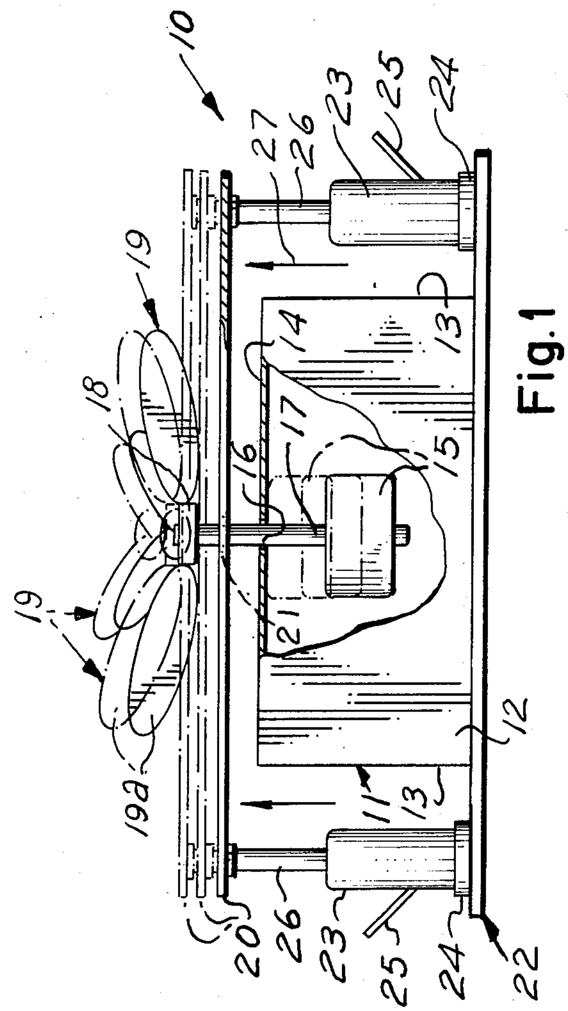
Figure 2:
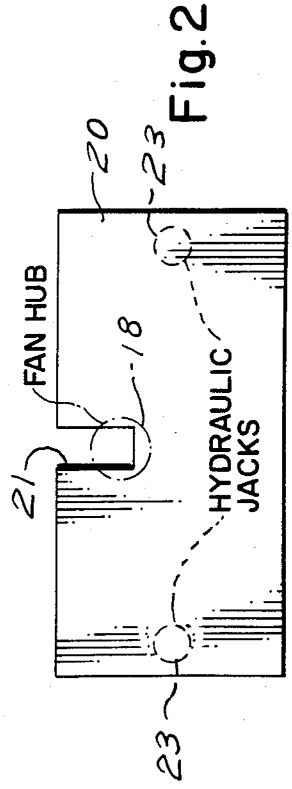

These, and other objects, will be readily evident, upon a study of the following specification, and the accompanying drawing, wherein:

FIG. 1 is a front elevational view of the present invention, shown partly broken away, and illustrates raised conditions of the pressure plate and fan blade, in phantom lines, and FIG. 2 is a top plan view of the pressure plate, shown on a smaller scale and removed from FIG. 1, with the jack shafts shown in dash lines, and the fan hub illustrated in phantom.

Accordingly, a device 10 is shown to include a metal housing 11 of rectangular configuration, having a front wall 12, a pair of end walls 13, and a top wall 14. A longitudinal edge of top wall 14 is fixedly secured to the top longitudinal edge of front wall 12, and the top edges of end walls 13 are fixedly secured to the ends of top wall 14, in a suitable manner. The rear of housing 11 is open, to freely receive fan motor 15, and a cut-out opening 16 is provided in the front of top wall 14, so as to receive freely the shaft 17 of motor 15. The hub 18 of fan blade 19, on shaft 17, extends above the pressure plate 20, and another cut-out opening 21 is provided in the front of pressure plate 20, in a similar fashion, as opening 16 through top wall 14, so as also to receive shaft 17. A base plate 22, of rectangular configuration, is provided, and the bottom end of housing 11 is fixedly secured to the top of base plate 22, in a suitable manner, not shown. A hydraulic jack 23 is disposed on each end of housing 11, and its base 24 is fixedly secured to the top of base plate 22 in a suitable manner, also not shown. The pair of jacks 23 include an operating handle 25, and the piston rods 26 of jacks 23 are fixedly secured, at their extended ends, to the bottom surface of pressure plate 20, so as to urge pressure plate 20 upward, as indicated by the arrows 27.

In operation, the motor 15 is placed within the confines of housing 11, with its shaft 17 inserted within the openings 16 and 21 of the top wall 14 and the pressure plate 20, respectively. The hydraulic jacks 22 are then operated by their handles 25, to apply hydraulic pressure through piston rods 26, to the bottom of pressure plate 20, which will urge the top of pressure plate 20 against the face of hub 19, thus forcibly pushing fan blade 19 off of the motor shaft 17.

During the abovementioned, the face of motor 15 is also urged against the bottom surface of top wall 14 of housing 11, and it shall be noted, that the pair of jacks 23 are operated simultaneously, to create an even pressure upward upon plate 20, for effective removal of fan blade 19. Metal shims may also be placed between hub 18 and pressure plate 20, when necessary, so as to raise hub 18, to prevent the blades **19*a* from being bent by pressure plate 20, during the operation of device 10**, and the removal of sheaths and gears is accomplished in the same manner, as above described.

While various changes may be made in the detail construction, it is understood that such changes will be within the spirit and scope of the present invention, as is defined by the appended claims.

I claim:

1. A portable fan blade and sheave removing device comprising, in combination, a rectangular housing having a front wall, a pair of opposite side walls and a top wall, an enlarged rectangular base plate affixed under a central portion of said housing, a rear side of said housing being open to freely receive a fan motor into said housing; and a cut-out notch in a rear of said top wall so as to receive an upwardly extending shaft of said fan motor; a hydraulic jack mounted upon opposite ends of said base plate; said jack including an operating handle and a slidable piston in a cylinder, upper ends of said piston being affixed to an underside of opposite ends of a pressure plate positioned between said housing top wall and a hub of a fan blade mounted on said shaft, and a cut-out notch in a rear of said pressure plate for receiving said shaft therethrough, said hydraulic jack operating handle forcibly urging said pressure plate against said fan blade hub for removal of said fan blade from said shaft.

* * * * *